Sheet 1 3 Sheets.

J. W. Mulley.
Mower.

No. 861

Reissued Nov. 29, 1859

Witnesses
W. Fairfax
R. Maille.

Inventor
J. W. Mulley by
A. Blake his atty

Sheet 2 - 3 Sheets

J. W. Mulley.

Mower.

№ 861

Reissued Nov. 29, 1859.

Witnesses

W. Fairfax

R. Maille

Inventor

J W Mulley by

A Pollok his atty

J. W. Mulley.

Mower.

No. 861

Reissued Nov. 29, 1859.

Witnesses

A. Dufabor

W. Fairfax

Inventor

J. W. Mulley by

A. Pollok his atty

UNITED STATES PATENT OFFICE.

JEREMIAH W. MULLEY, OF AMSTERDAM, NEW YORK.

IMPROVEMENT IN REAPING AND MOWING MACHINES.

Specification forming part of Letters Patent No. 16,599, dated February 10, 1857; Reissue No. 861, dated November 29, 1859.

DIVISION C.

*To all whom it may concern:*

Be it known that I, JEREMIAH W. MULLEY, of Amsterdam, in the county of Montgomery and State of New York, have invented a new and useful Improvement in Mowing and Reaping Machines; and I do hereby declare that the following is a full and clear description thereof, reference being had to the accompanying drawings, which form part of this specification, and in which—

Figure 1:
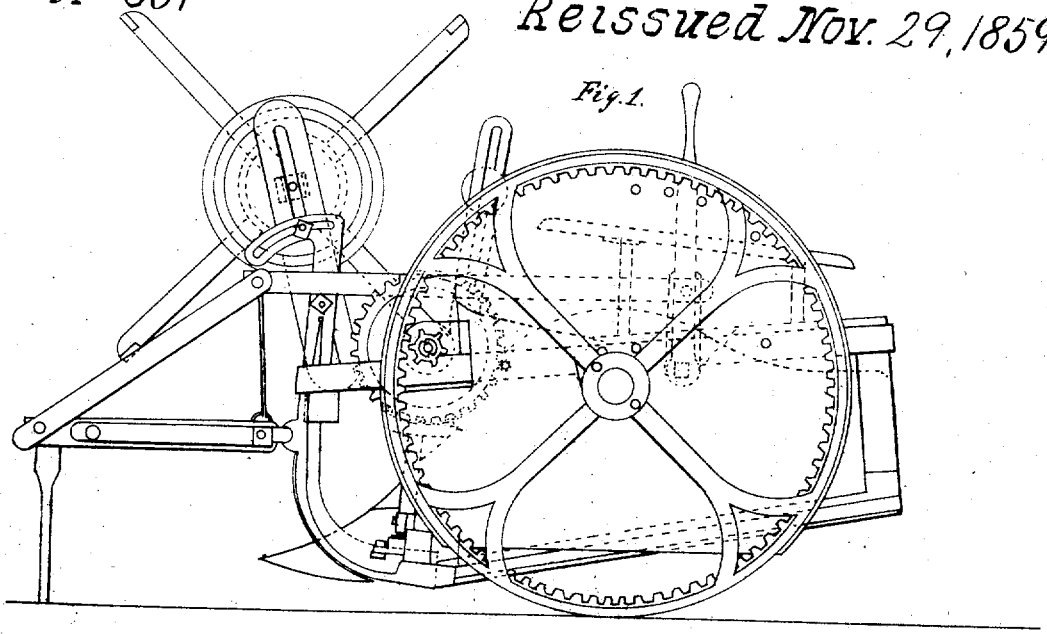
Figure 2:
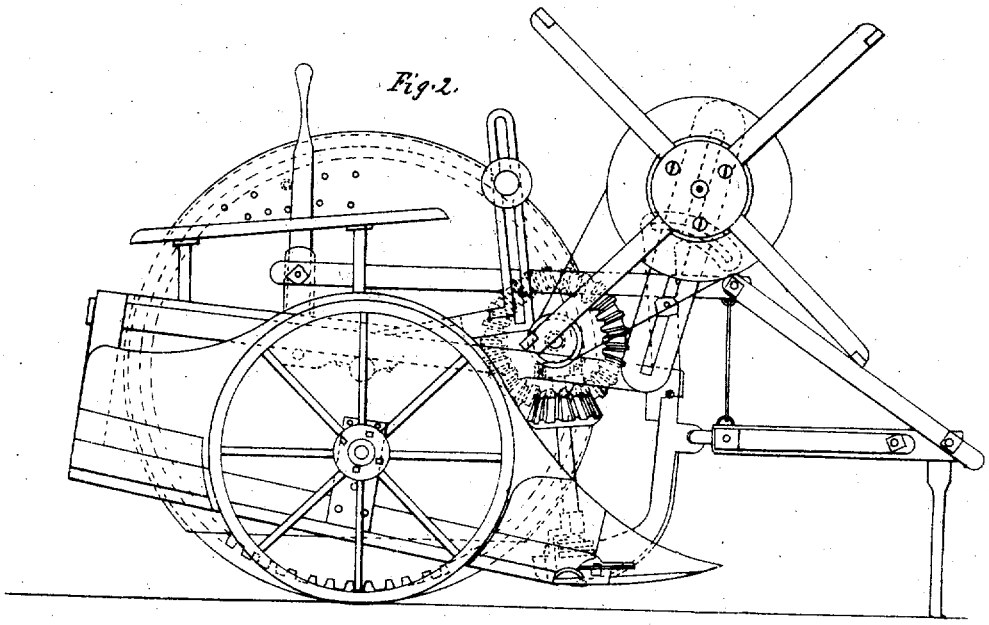
Figure 3:
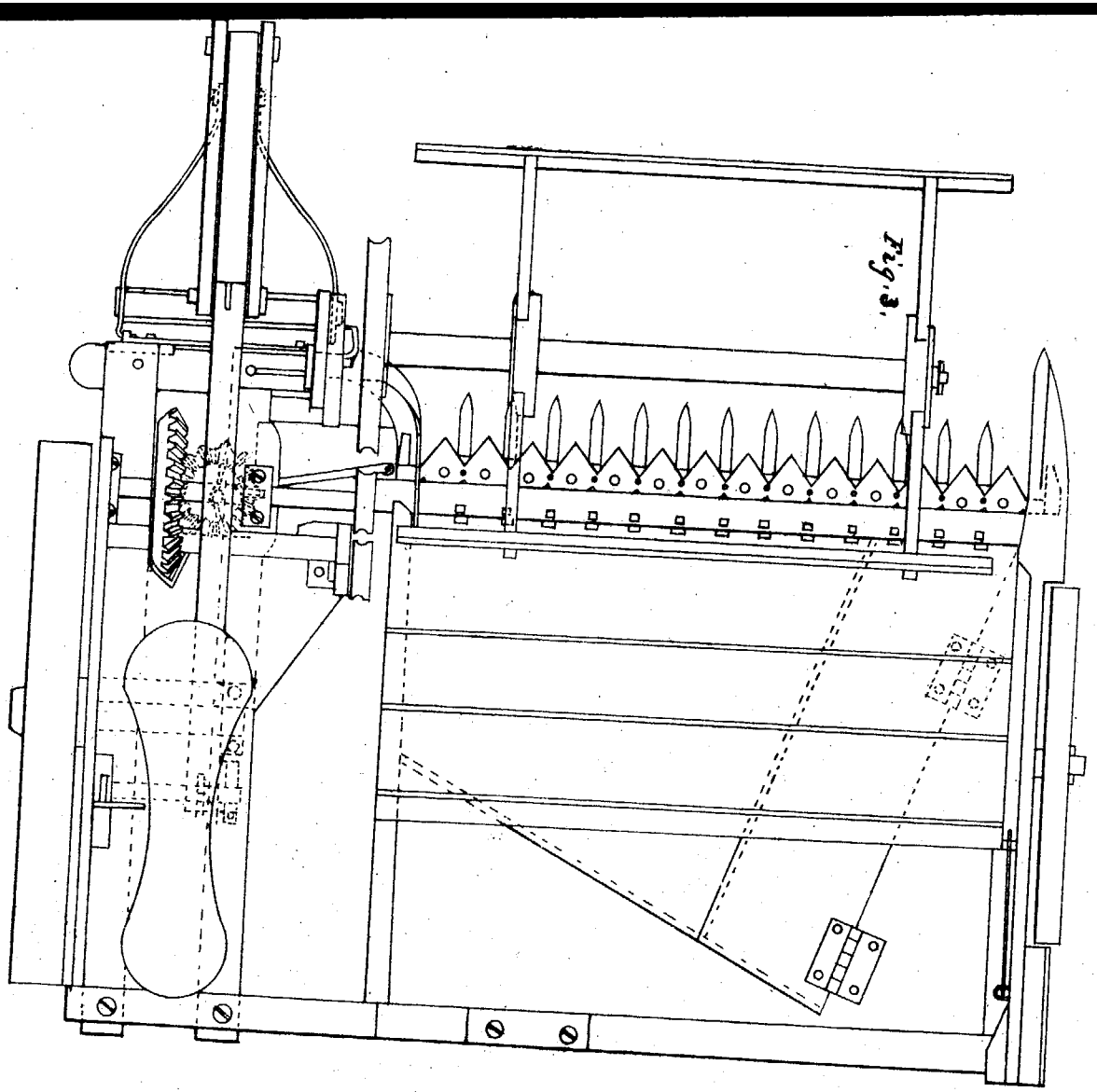

Figures 1 and 2 represent opposite side elevations of a machine with my improvement applied to it; Fig. 3, a plan view thereof; and Figs. 4 and 5, a partial plan and sectional elevation, on a larger scale, of the finger and cutter portion of the machine, to which part my present improvement relates.

In this my improvement the cutter is shown to occupy its ordinary position in front of the machine for reciprocation across the traverse of the latter. The means for reciprocating the cutter may be varied. It is therefore unnecessary here to refer to any particular ones, nor yet to describe the general form of the cutter and connection with the fingers, or relative arrangement of the latter, as those acquainted with harvesters generally need no such description of parts that are common, any more than they do of the peculiar functions of such devices. I will therefore merely preface the description of my improvement by saying that I adopt that previously-known style of reciprocating cutter the peculiarity of which consists in the employment of a series of projecting blades formed to cut on either of their projecting edges, and secured at a suitable distance from their points or fronts to a cutter-bar that may be guided by traversing it through slots in the fingers, which latter are also usually slotted in front to receive through them the projecting blades that effect the cut, said blades being generally of a V shape or saw-tooth form, and said fingers secured to or held down by a bar in the rear. This preface will more clearly explain what is new and useful in the sequel and render a lengthy description superfluous.

Figure 4:
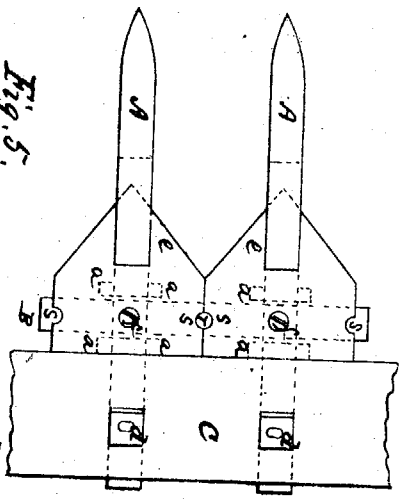
Figure 5:
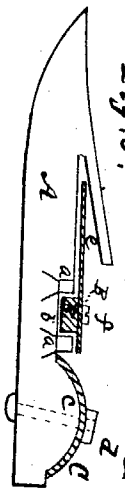

Referring to the accompanying drawings, or more particularly to Figs. 4 and 5 thereof, the fingers A may be of the usual or any other suitable general configuration; but as here shown I make them with lateral projecting lips *a a* in front and in rear of the slots *b* in the fingers through which the cutter-bar B in its reciprocating action plays or is guided. By these lips being arranged to form lateral continuations to the back and front sides or edges of said slots, they thus serve not merely to stiffen the fingers where the slots weaken them, but, without adding materially to weight and avoiding objectionable thickness of the fingers, also serve to give a wide and steady bearing to the cutter-bar at its edges, and to diminish or more generally distribute wear by the increase in length or width given to the cutter-bar and finger surfaces coming or thrown in contact by forward and backward thrust or pressure. By such construction, too, the liability to breakage is diminished, and the fingers generally may be constructed narrower or lighter. I also make the rear portion of the fingers with a swell or convex upper projection, *c*, that not simply serves to stiffen the fingers at their roots, but forms a bearing for the finger-bar C to both hold down the fingers and also more securely restrain them from moving forward and backward, and that admits of my using a finger-bar made of sheet-iron and bent longitudinally into a curved or arched form, and which combines stiffness with lightness and does away with objectionable abruptness of top surface. The concave side of this bar C being laid on the convex projections *c* of the fingers, bolts *d* may be passed through the bar and fingers to draw and hold them together; and the finger-bar may be secured to the machine in any suitable manner.

On the upper side or face of the cutter-bar B are the cutters *e*. These cutters may be steel blades, of V shape or saw-tooth form in front, sharpened on both sides or edges, but presenting straight and parallel (or thereabout) sides at their bodies or rear portions, and preferably a straight line or edge at their backs. Said blades may be secured to the cutter-bar B by bolts or screws *f*, that may unite the blades to the bar at or about the center in width of the former, and which will admit of a speedy removal and replacement of any one or more of the blades. To prevent said blades, when thus or otherwise equivalently or suitably held to the cutter-bar, from working loose or turning, and in turning and rising riding one over the other, or, in other words, to effect the lateral adjustment and hold of these blades, I form these several adjacent sides or edges of the bodies of the blades with notches *s s*, arranged to face each other, and of semicircular or other suitable shape, to receive within them rivets or pins *r*, or their equivalent, attached to or connected with the cutter-bar, by which means I effectually lock the several blades together from lateral action or twist individually, and steady their hold generally without impeding their attachment or detachment to or from the cutter-bar, when required. The pins *r*, that fit in the side notches of the blades, also serve to take off strain from the screws *f* in effecting the reciprocation of the cutter.

What I claim as my invention, and desire to secure by Letters Patent, is—

1. The manner herein described of securing the detachable cutters or blades to or in their place on the cutter-bar, and relatively to each other, by means of central holding-screws, in combination with pins or studs on the bar to fit the recesses in the adjoining sides of the blades, substantially as set forth.

2. Providing the fingers with the laterally-projecting lips in front and rear of the slot in which the cutter-bar plays, substantially in the manner and for the purposes specified.

3. The finger-bar, arched as described, in combination with the fingers made with a swell or convex projection in their rear, substantially as herein set forth.

In testimony whereof I have hereunto subscribed my name in presence of two witnesses.

J. W. MULLEY.

Witnesses:
A. McELWAIN,
JOHN A. HANSON.